(12) United States Patent
Mostyn et al.

(10) Patent No.: US 6,199,509 B1

(45) Date of Patent: Mar. 13, 2001

(54) GRAVITY DEER FEEDER WITH BAFFLES

(76) Inventors: Ronny W. Mostyn, Rte. 3, Box 103E, Weimar, TX (US) 78962; Ronnie Aschenbeck, R.R. 1, Box 1631, Columbus, TX (US) 78943; Ronald Rhodes, P.O. Box 1294, New Ulm, TX (US) 78950

( * ) Notice: Subject to any disclaimer, the term of this patent is extended or adjusted under 35 U.S.C. 154(b) by 0 days.

(21) Appl. No.: 09/371,248

(22) Filed: Aug. 10, 1999

Related U.S. Application Data

(60) Provisional application No. 60/096,084, filed on Aug. 11, 1998.

(51) Int. Cl.$^7$ .......................................................... A01K 5/00
(52) U.S. Cl. ........................................ 119/51.01; 119/52.1
(58) Field of Search ............................... 119/51.01, 52.1, 119/52.2, 52.3, 52.4, 53, 61

(56) References Cited

U.S. PATENT DOCUMENTS

| | | | |
|---|---|---|---|
| 3,566,843 | * 3/1971 | Van Huis . | |
| 3,742,914 | * 7/1973 | Spencer et al. | 119/52.2 |
| 3,935,838 | * 2/1976 | Johnson | 119/54 |
| 4,201,155 | * 5/1980 | Hyde, Jr. | 119/57.8 |
| 4,223,637 | * 9/1980 | Keefe | 119/52.2 |
| 4,318,364 | * 3/1982 | Bescherer | 119/52.1 |
| 4,327,669 | * 5/1982 | Blasbalg | 119/52.1 |
| 4,538,548 | * 9/1985 | Page | 119/52.1 |
| 5,333,572 | * 8/1994 | Nutt | 119/57.91 |

* cited by examiner

Primary Examiner—Peter M. Poon
Assistant Examiner—Yvonne R. Abbott
(74) Attorney, Agent, or Firm—Howrey Simon Arnold & White, LLP

(57) ABSTRACT

A feeder comprising a hopper with an upper portion and a lower portion; the lower portion of the hopper includes a domed base to the interior of the hopper and also includes at least one feeding port to provide a passage for feed from the interior to the exterior. The hopper also includes one or more baffles projecting from the interior wall of the hopper that act to support at least some of the feed stored within the hopper.

6 Claims, 4 Drawing Sheets

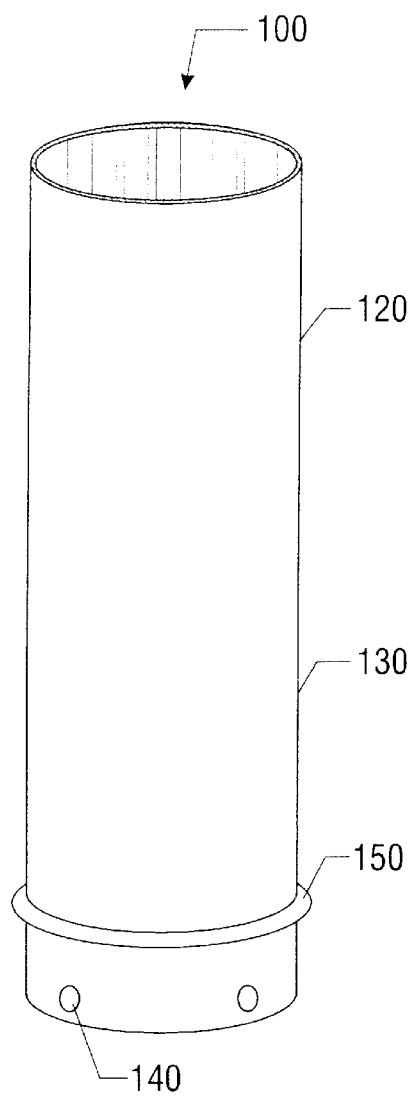
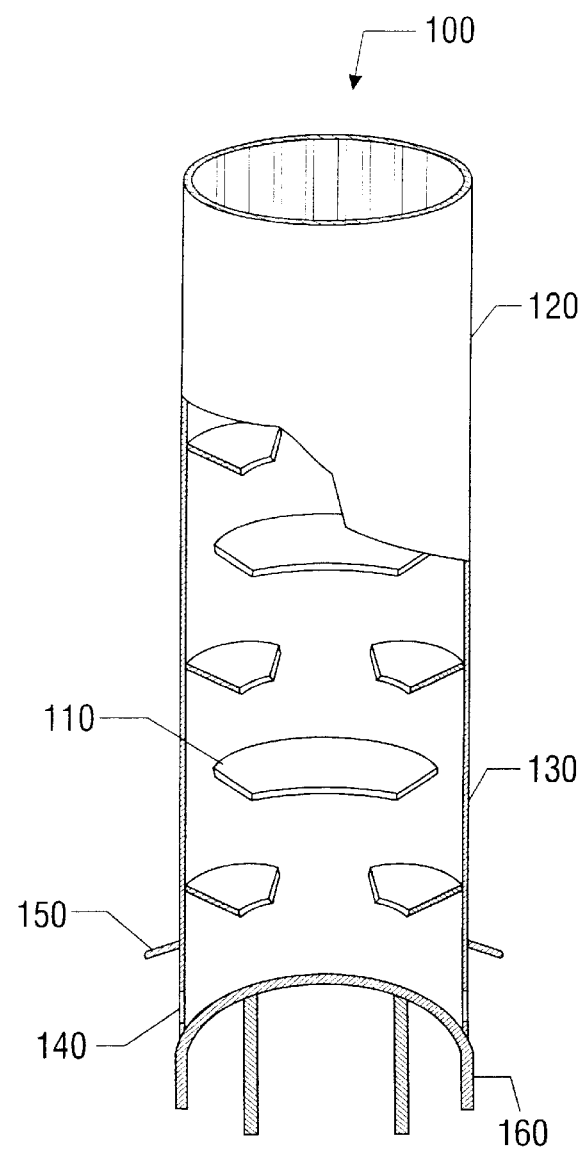
FIG. 1
FIG. 2

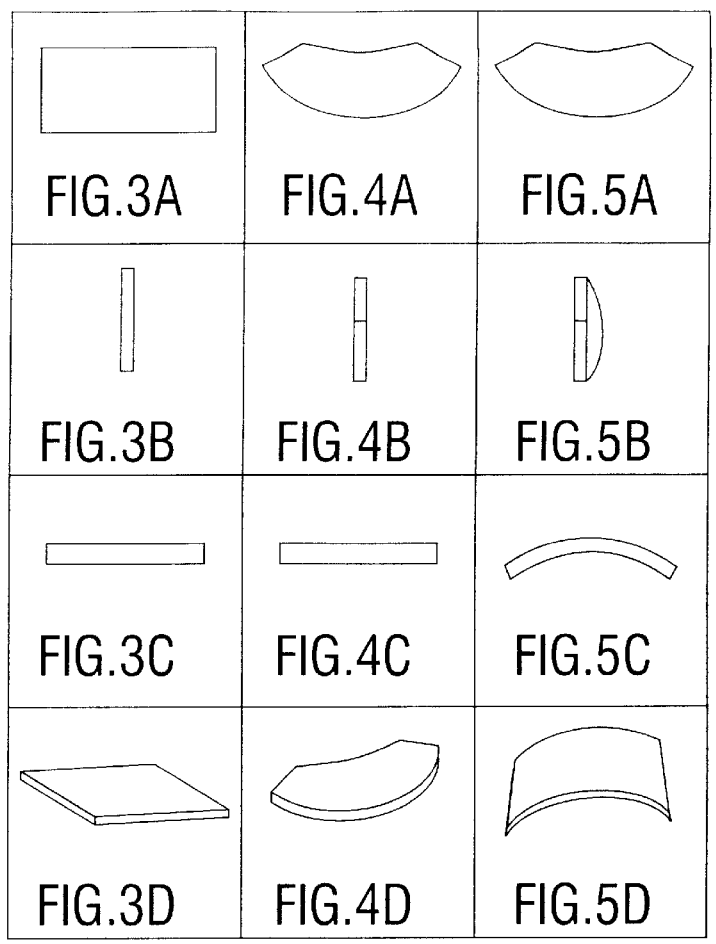
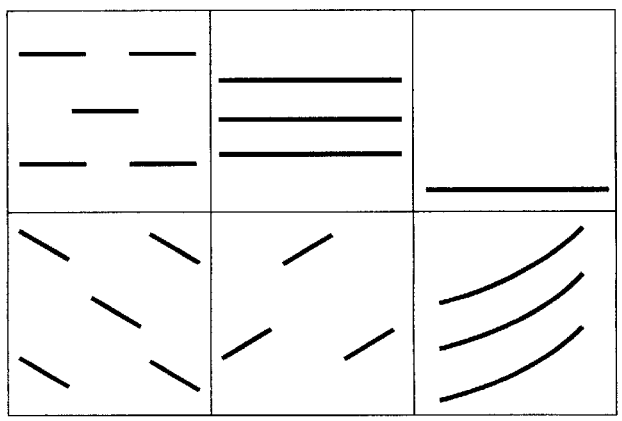

GRAVITY DEER FEEDER WITH BAFFLES

RELATED PATENTS AND APPLICATIONS

This application claims priority from Provisional Patent Application Ser. No. 60/096,084 filed Aug. 11, 1998.

BACKGROUND OF THE INVENTION

Over the course of the last several years, there has been an increasing desire to maintain and encourage animal populations as a measure to promote the environment and for both subsistence and recreational hunting.

A chief concern of those interested in promoting animal populations is the provision of adequate food supplies during those times when naturally occurring forage is not sufficient to support dependent animal populations. These periods typically occur during the harsh winter and summer months but may occur at any time due to a variety of factors (drought, flood, etc.).

This concern is often addressed by the provision of some sort of feeding system (also known as a "feeder"); however, these feeding systems suffer from a number of deficiencies. One type of feeder known to the art includes an electric motor (often battery powered) and a timer. U.S. Pat. Nos. 5,926,441 and 5,873,326 are examples of this type of feeder. The timer activates the motor and distributes feed (usually corn) on the ground or in troughs periodically. This feeder design often results in excessive waste of the feed because feed is dispensed without regard to demand by the dependent animal population. A further disadvantage of feeders with this design is the regular maintenance required to verify that the mechanical aspects of the feeder are in good working order (i.e., the motor and timer are still working and that there is an adequate power supply).

Still other feeders known to the art are wind- or movement-powered, thereby eliminating the need for electricity or batteries as described above. Because of the uncertain or intermittent nature of the mechanical action of this type of feeder, control of feed distribution is problematic and often results in either inadequate or excessive distribution.

In addition, prior art feeders often utilize troughs from which the dependent animal population may obtain distributed feed. This type of feeder is referred to as a "free choice feeder." One disadvantage of this feeder design is that large quantities of feed often accumulate in the troughs of free choice feeders as feed is continually deposited in the trough by the action of the distribution mechanism (i.e., the motor/timer, wind action, etc.). Thereafter, feed accumulated in the troughs is exposed to the elements and begins to decompose or spoil. A further disadvantage of this design is the ease with which undesirable animal populations (typically, squirrels, hogs, birds, etc.) may access the troughs in free choice feeders and consume feed intended for the targeted animal population. A further disadvantage of this design is the periodic maintenance required to prevent contamination of the feed supply by the feed accumulated in the troughs and the associated cleaning and maintenance.

In addition, a further disadvantage of prior art feeders is the use of multiple leg supports and/or tree mounting. Animals may become snared or entangled in these leg supports as they attempt to consume the large quantity of feed that often surrounds the leg supports. As a result, the leg supports and/or feeder are often damaged as the animal tries to free itself In addition, the multiple leg supports provide an effective point of attack for animals attempting to overturn the feeder. Tree mounted feeders are similarly susceptible to wind damage of all types, whether to the feeder itself or to the supporting tree.

With the foregoing in mind, there is a pressing need for a feeder that does not suffer from one or more of the above disadvantages, i.e., that is less susceptible to mechanical failures, that can withstand prolonged exposure to the elements, that minimizes the likelihood of damage, that minimizes loss of feed to non-targeted animal populations, or that efficiently distributes feed to targeted animal populations.

SUMMARY OF THE INVENTION

The present invention is a feeder comprising a hopper fitted with interior baffle(s), at least one or more feeding ports spaced about the lower perimeter thereof, and a domed or angled based in the hopper. This hopper may further be fitted with a feed container attached to the hopper which provides increased feed storage capacity and which may itself be fitted with a reduced diameter base (a funnel). Fitted with this base, the feed container may be larger than the hopper itself (and thereby able to store a larger quantity of feed) while still directing the feed into the hopper. Further, either the hopper or the feed container may be fitted with a movable or removable lid which protects the contents from contamination by precipitation or other foreign matter. In addition, the feeding ports may further be protected by the provision of rain guards intended to direct precipitation away from the feeding ports. Finally, the feeder may be supported on a single pillar, column or other similar support structure.

By operation of gravity, feed travels downward through the hopper striking a series of baffle(s) which slow the flow of and alleviate compaction of feed on the domed or angled base. This domed or angled base holds feed in a loose and stable state adjacent to feeding ports open to the exterior of the hopper where it is available for consumption.

BRIEF DESCRIPTION OF THE DRAWINGS

FIG. 1 illustrates one embodiment of a hopper.

FIG. 2 is a cutaway view of the hopper shown in FIG. 1.

FIGS. 3(a)–5(d) are perspective views of baffle designs.

FIGS. 6(a)–6(f) illustrate possible baffle configurations.

DESCRIPTION OF ILLUSTRATIVE EMBODIMENTS

Referring initially to FIG. 1, there is shown hopper 100 in which feed intended for a target animal population is stored. As shown in the figure, hopper 100 is an elongate, hollow cylinder with an upper portion 120 and a lower portion 130. However any shape capable of holding feed for the target animal population (e.g., a rectangular tube, a box, etc.) would similarly be suitable to practice the instant invention.

FIG. 2 is a cutaway view of hopper 100 depicting baffle(s) 110 contained within the interior of hopper 100. As shown in the figure, baffle(s) 110 are formed by projections extending from the interior wall of hopper 100 toward the center of the tube formed by hopper 100. In this arrangement, baffle(s) 110 support at least some of the weight of feed contained within hopper 100. By supporting this weight, baffle(s) 110 alleviate or reduce the tendency of feed in hopper 100 to become compacted in the lower portion 130 of hopper 100.

A variety of baffle designs and configurations are suitable for this task. Selection of a particular baffle design and configuration is often suggested, but not necessarily determined, by the shape of the interior of hopper 100. Some of these baffle designs are shown in FIGS. 3(*a*)–5(*d*). As shown in FIGS. 3(*a*)–5(*d*), baffle(s) 110 may be planar or curved and in or angled about one or more axis or any combination thereof. The angle in any axis of baffle(s) 110 is selected so as to reduce or alleviate compaction of feed while still allowing free flow of feed by operation of gravity, and the particular configuration will be suggested by the shape of hopper 100 and the characteristics of the feed.

Illustrated in FIGS. 6(*a*)–(*f*) is a hopper wall bearing just some of the baffle configurations which may be employed. As shown in FIG. 6(*a*), baffle(s) 110 may be segmented and in an alternating series. FIG. 6(*b*) depicts an alternative configuration where baffle(s) 110 form a contiguous series. In FIG. 6(*c*), baffle(s) 110 are formed by a single contiguous ring about the interior of hopper 100. FIG. 6(*d*) illustrates slanted alternating configuration while FIG. 6(*e*) illustrates a slant in the opposite direction. Finally, FIG. 6(*f*) illustrates a helical configuration.

Baffle(s) 110 extend from the interior walls of hopper 100 towards the center thereof. In this dimension, baffle(s) 110 are sized so as to reduce or alleviate feed compaction while still allowing feed to flow freely by operation of gravity and the particular configuration will be suggested by the shape of hopper 100 and the characteristics of the feed. Thus, baffle(s) 110 may extend only a short distance from the interior walls of hopper 100 toward the center or may cover a substantial portion of the diameter of hopper 100.

Figure 7:
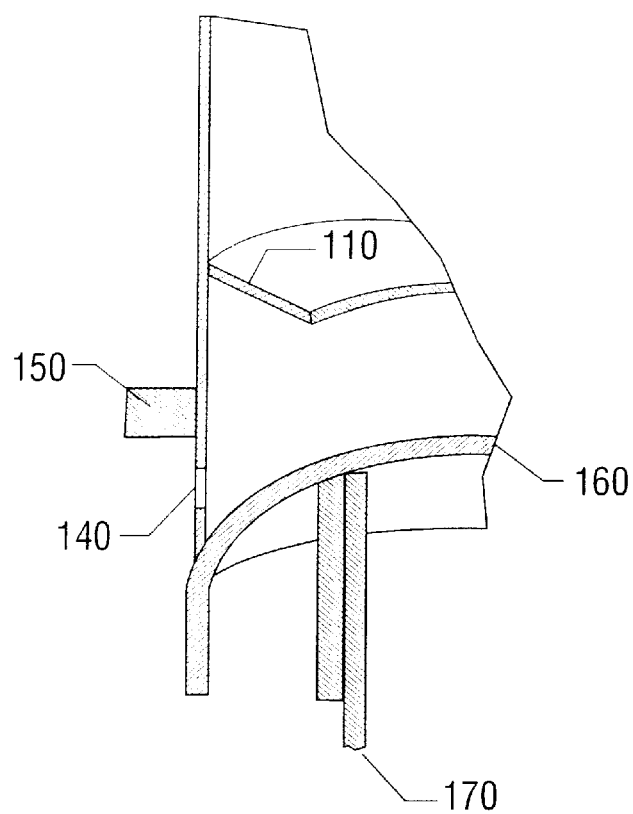
FIG. 7 is a cutaway view of the hopper.
Figure 8:
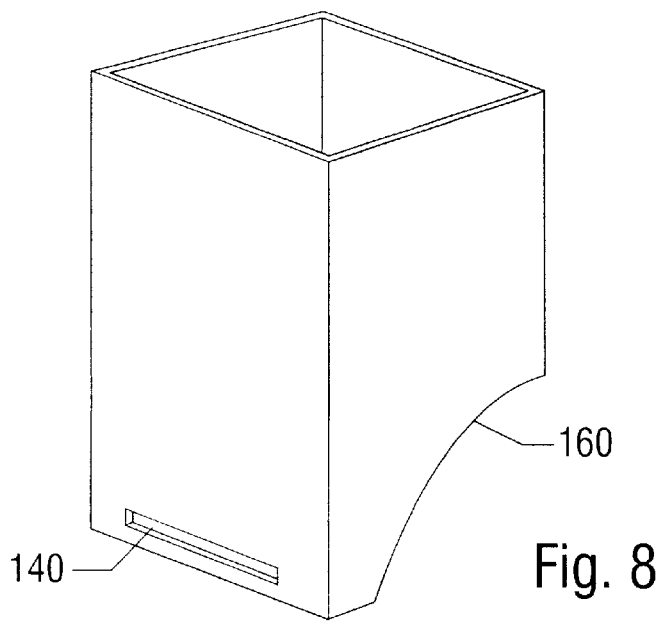
FIG. 8 shows an alternative hopper, base, and feeding port design.

As shown in FIG. 7, when in a segmented configuration of the type shown in FIG. 6(*a*), at least one of baffle(s) 110 is positioned in vertical alignment with and above at least one feeding port 140. Feeding ports 140 are formed by passages from the interior of hopper 100 to the exterior thereof through which feed intended for target animal consumption passes. A variety of feeding port sizes and configurations will be suitable for this task and the selection of the size and configuration will typically be suggested by the type and size of feed, hopper shape, and characteristics of the target animal population. While typically round in shape, feeding ports 140 may be of any suitable shape including a slit as shown in FIG. 8. In order to minimize the likelihood that precipitation or other foreign matter will enter hopper 100 through feeding ports 140 and thereby cause/accelerate spoilage of feed therein, rain-guards 150 may be affixed to the exterior of hopper 100 above feeding ports 140. Rain-guards 150 are formed by projections extending from the exterior of hopper 100 a distance suitable to protect feeding ports 140 from precipitation and are positioned and dimensioned so as not to interfere with target animal access to feeding ports 140.

Returning to FIG. 7, base 160 is shown as a symmetric dome whose peak is contained within the interior of hopper 100. This curved base directs feed away from the center of hopper 100 and toward feeding ports 140. Again, a variety of base designs will be suitable, however it is preferable (though not required) that the base be angled so as to direct feed toward feeding ports 140. An alternative base design suitable for an alternative hopper shape is shown in FIG. 8.

Figure 9:
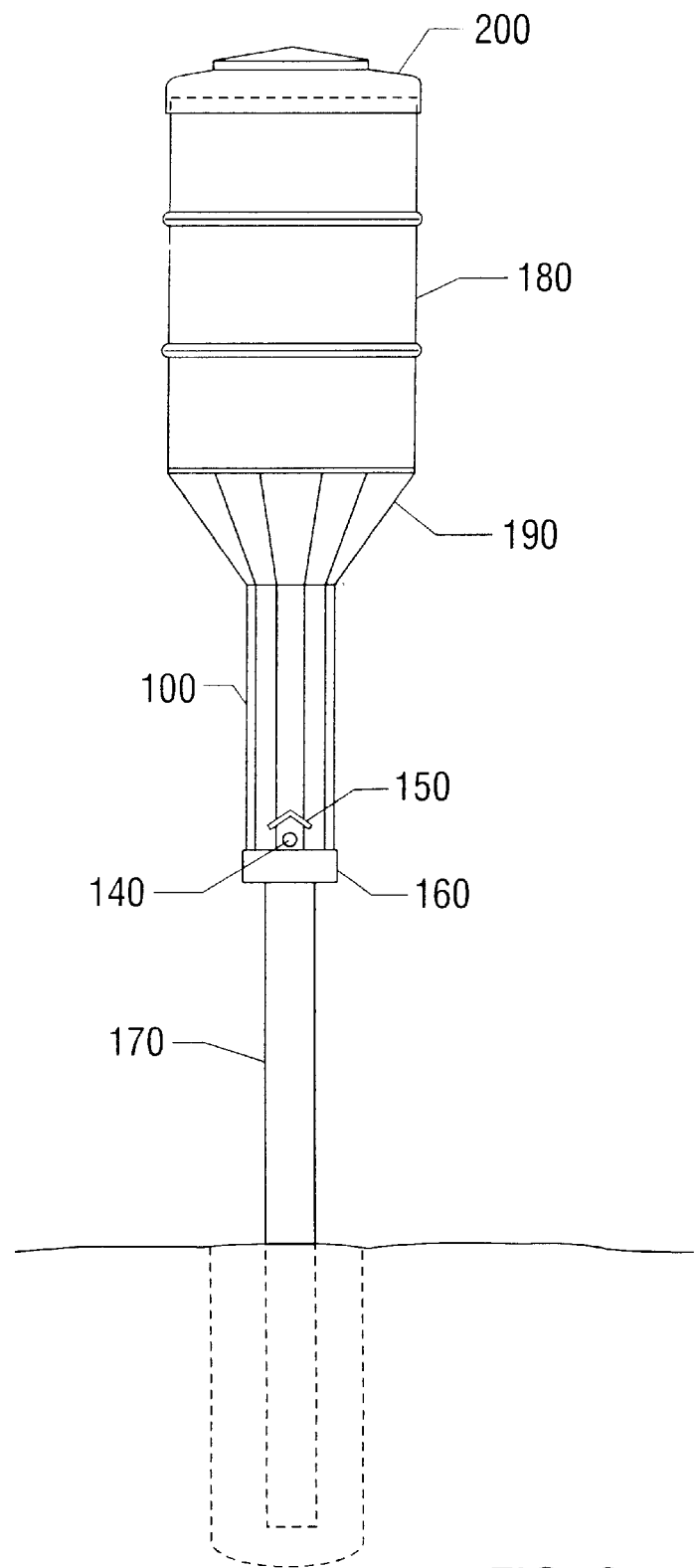
FIG. 9 is an exterior view of the feeder in a possible installation.

Returning to FIG. 7, there is shown support pillar 170. Support pillar 170 supports hopper 100 and the feed contained therein and may be formed by a variety of support means. Support pillar 170 has a lower portion and an upper portion. The upper portion of support pillar 170 is adapted to join to hopper 100. As shown in FIG. 7, support pillar 170 is a pipe which couples with a receiving portion attached to base 160. The lower portion of support pillar 170 may be fixedly secured to the earth or other support surface. As shown in FIG. 9, the lower portion of support pillar 170 is set in a footing consisting of a hole filled with concrete. A number of alternative support pillar designs, legs, and attachment means will similarly be suitable, including wooden posts, steel angle, pipe, tub, masonry, nails, bolts, welding, etc.

As shown in FIG. 9, optionally attached to the upper portion 120 of hopper 100 is feed container 180. In the figure, feed container 180 is a cylinder open at each end which allows feed to be loaded at the top and to pass into hopper 100 through the lower portion thereof. As with hopper 100, feed container 180 may be any shape capable of retaining feed. Feed container 180 provides additional space to store feed which then passes into hopper 100 through the open top of hopper 100 or though a similar passageway. With the provision of funnel 190 or other similar structure, feed container 180 may be greater in diameter than hopper 100 thereby increasing the storage capacity of feed container 180.

Either hopper 100 or feed container 180 may further be equipped with a removable or movable lid (such as lid 200 of FIG. 9) to prevent precipitation or other foreign matter from entering hopper 100 or feed container 180 and causing or accelerating spoilage of feed contained therein. As shown in FIG. 9, lid 200 is formed by a removable dome which fits over the end of feed container 180. This removable or movable configuration enables feed loading though the top of hopper 100 or feed container 180 while still providing a means for protecting the content of the hopper 100 or feed container 180 from precipitation or exposure.

In operation, lid 200 is first removed or moved to reveal the open end of feed container 180 or hopper 100. Feed is then loaded into the feeder. As feed passes through feed container 180 it moves into hopper 100 where some of the weight of the feed is supported by baffle(s) 110 thereby eliminating or alleviating compaction of feed against base 160 or the interior of hopper 100. As feed moves down through the feeder by operation of gravity, base 160 directs the feed toward feeding ports 140. From feeding ports 140, target animals may obtain feed which is held in a loose state.

FIGS. 7 and 9 illustrate aspects of the preferred embodiment. In the preferred embodiment, hopper 100 is cylindrical. Affixed to the interior wall thereof, baffle(s) 110 are substantially planar and are disposed at a 113° angle to the plane defined by the hopper wall to which they are attached (downwardly angled). Baffle(s) 110 are formed by a single contiguous ring about the interior of hopper 100. There are four, symmetrically spaced feeding ports 140 each of which is circular in shape and positioned below one of baffle(s) 110. Affixed to the exterior of hopper 100 and above feeding ports 140 are rain-guards 150 which are chevron-shaped and downwardly angled with respect to the exterior of hopper 100.

Base 160 of hopper 100 is formed by a domed pipe cap. Affixed to the interior of base 160 in FIG. 7 is a pipe section dimensioned to receive support pillar 170. Support pillar 170 is steel pipe which is coupled to the complementary pipe section of base 160. The other end of support pillar 170 is secured in a concrete footing.

As is further shown in FIG. 9, feed container 180 is in the shape of a cylinder and may be formed by a standard fifty-five (55) gallon drum with openings cut into each end. One end of feed container 180 is connected to funnel 190 which is further connected to hopper 100. The other end of feed container 180 is covered by lid 200. Lid 200 consists of a dome shaped disc slightly larger than the open end of feed container 180 over which it fits.

Of course, the foregoing is merely a description of illustrative embodiments and many alternative embodiments will be apparent to those of ordinary skill in the art who have the benefit of this disclosure. It should be understood that various changes, substitutions, and alterations can be made without departing from the spirit and scope fo the invention as defined by the appended claims.

What is claimed is:

1. A feeder comprising:

a hopper with an upper portion and a lower portion;

said hopper lower portion including a domed base to the interior of said hopper;

said hopper lower portion further having at least one feeding port allowing access to the interior of the hopper from the exterior;

said hopper further including one or more baffles projecting from the interior wall of the hopper and adapted to support at least some of the feed stored within said hopper;

said hopper upper portion connected to a feed container.

2. The feeder of claim 1 wherein said feed container is connected to said hopper by a funnel.

3. The feeder of claim 2 wherein the open end of said feed container is covered by a removable lid.

4. The feeder of claim 3 wherein said hopper is supported by a pillar.

5. The feeder of claim 2 wherein the open end of said feed container is covered by a movable lid.

6. The feeder of claim 5 wherein said hopper is supported by a pillar.

* * * * *